United States Patent [19]

Richter et al.

[11] Patent Number: 4,508,473

[45] Date of Patent: Apr. 2, 1985

[54] SIMPLE DRY FEEDER

[75] Inventors: Ole J. Richter, Karlstad, Sweden; Erwin D. Funk, Glens Falls, N.Y.

[73] Assignee: Kamyr, Inc., Glens Falls, N.Y.

[21] Appl. No.: 468,674

[22] Filed: Feb. 22, 1983

[51] Int. Cl.³ .............................................. B65G 53/46
[52] U.S. Cl. ........................................ 406/64; 406/63
[58] Field of Search ................................ 406/63–68; 414/219, 220

[56] References Cited

U.S. PATENT DOCUMENTS

| | | | |
|---|---|---|---|
| 2,652,935 | 9/1953 | Messing | 414/420 |
| 2,795,464 | 6/1957 | Richards et al. | 406/67 |
| 3,206,254 | 9/1965 | Mylting | 406/64 X |
| 3,224,813 | 12/1965 | Jezo | 406/64 |
| 4,047,901 | 9/1977 | Baron et al. | |
| 4,264,238 | 4/1981 | Leckband et al. | |
| 4,430,029 | 2/1984 | Richter et al. | 406/63 |

FOREIGN PATENT DOCUMENTS

| | | |
|---|---|---|
| 1125372 | 8/1968 | United Kingdom . |
| 1447737 | 8/1976 | United Kingdom . |
| 2024158 | 1/1980 | United Kingdom . |
| 2087356 | 5/1982 | United Kingdom . |
| 2091573 | 8/1982 | United Kingdom . |
| 673564 | 7/1979 | U.S.S.R. ........................ 406/65 |

Primary Examiner—Jeffrey V. Nase
Attorney, Agent, or Firm—Cushman, Darby & Cushman

[57] ABSTRACT

A low pressure feeder includes a rotor containing at least one pocket having a single access opening to it, the rotor rotatable about an axis and enclosed in a housing having an inlet port vertically above an outlet port. A sealing structure is disposed in a large clearance volume between the rotor and the housing, the sealing structure comprising a single shoe having an opening communicating with the inlet port, and one or more pressure compensators for biasing the shoe into engagement with the rotor. The pressure compensators are responsive to the process pressure at the feeder high pressure outlet port. A gas blast structure is provided for supplying a blast of gas to the pocket to effect discharge of material from the pocket when it is in communication with the outlet port. A vent is provided immediately before the inlet port in the direction of rotation of the roller, the access opening being dimensioned with respect to the vent and inlet port so that it can communicate with both during a portion of path of rotation thereof.

11 Claims, 6 Drawing Figures

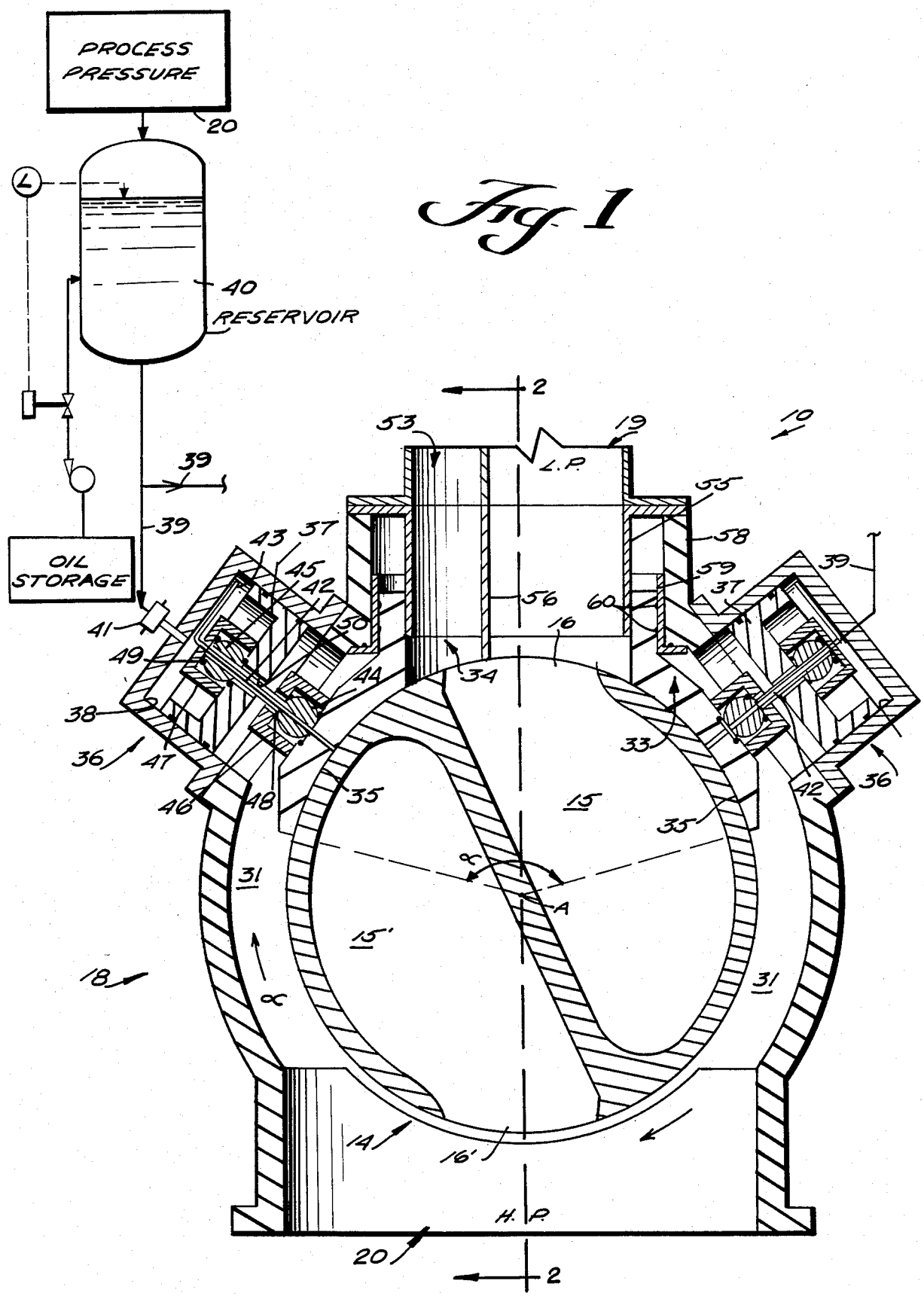

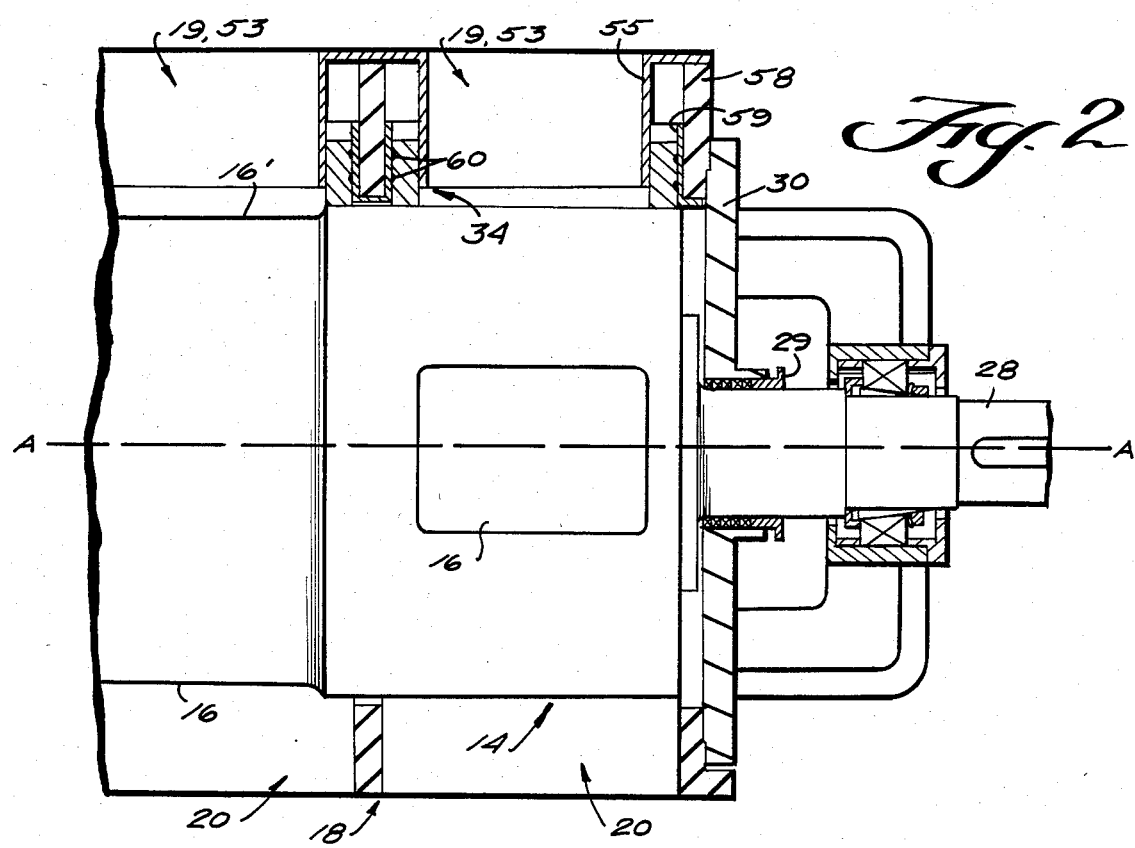
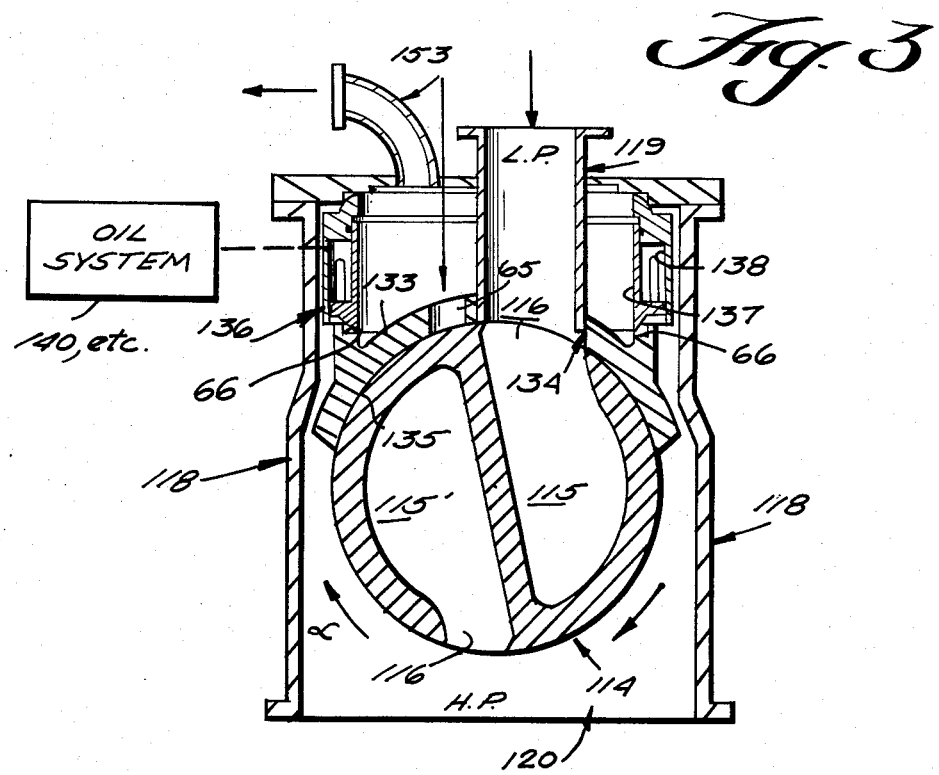

SIMPLE DRY FEEDER

BACKGROUND AND SUMMARY OF THE INVENTION

The invention relates to a low pressure feeder, such as a device to be used to feed a metered amount of particulate material entrained in fluid from a low pressure area to a slightly higher pressure area. The feeder separates the high and low pressure areas while providing for the transfer of particulate material from one area to the other. Typical installations in which such feeders are utilized are in the pulp and paper field (such as between a chips bin and a steaming vessel), and in the coal and ore handling field (such as for feeding coal to a fluidized bed reactor).

The low pressure feeder according to the present invention has many features in common with the feeder disclosed in co-pending application Ser. No. 296,245 filed Aug. 24, 1981, the disclosure of which is hereby incorporated by reference herein. The feeder according to the present invention is simpler than the feeder disclosed in said co-pending application, however, and has a number of operational advantages.

The feeder according to the present invention requires only one shoe means providing a sealing means between a rotor and housing comprising the feeder. The shoe means has an opening communicating with the housing inlet port and in sealed engagement therewith. Also means are provided for biasing the shoe means into engagement with the rotor, and such means comprise improved pressure compensators operatively connected up to process pressure (e.g. the pressure at the housing outlet port). In one embodiment of the pressure compensators, a small amount of lubricating oil is supplied between the shoe means and the rotor, proper venting of any gas which might collect in the pressure compensator (as during start-up) is provided, and the pressure compensator is operable even after substantial wear of the shoe means.

The feeder according to the invention is advantageous in that the access opening of the at least one rotor pocket may, and does, communicate at the same time with a vent and inlet port. This ensures complete venting of the pocket while it is being filled. The action of the particulate material flowing into the pocket facilitates venting, ensuring a full charge in the pocket.

The feeder according to the invention is also advantageous in that a blast of gas at a pressure substantially higher than the pressure at the outlet port is supplied to the interior of the pocket when the access opening is in communication with the outlet port. This ensures discharge of the particulate material from the pocket even when the pressure at the outlet port is relatively high.

It is the primary object of the present invention to provide a simple, effective feeding device to feed a metered amount of particulate material entrained in fluid from a low pressure area to a slightly higher pressure area. This and other objects of the invention will become clear from an inspection of the detailed description of the invention and from the appended claims.

BRIEF DESCRIPTION OF THE DRAWINGS

FIG. 2 is a vertical cross-sectional view, showing some parts in elevation, of the feeder of FIG. 1 taken along lines 2—2 thereof;

FIG. 3 is a vertical cross-sectional view of another exemplary low pressure feeder according to the present invention;

FIG. 4 is a partial vertical cross-sectional view like that of FIG. 2, for another embodiment of feeder according to the present invention.

DETAILED DESCRIPTION OF THE DRAWINGS

Figure 1:
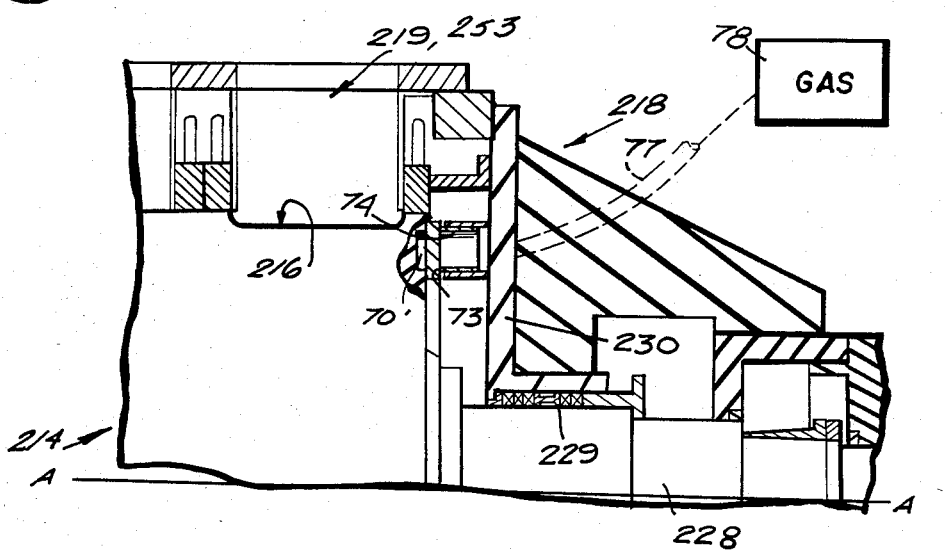
FIG. 1 is a vertical cross-sectional view of an exemplary low pressure feeder according to the present invention.

The exemplary feeder 10 illustrated in FIGS. 1 and 2 will be hereinafter described in conjunction with a chips bin and a steaming vessel, however it is to be understood that the feeder 10 may be utilized in other environments for the feeding of particulate material from one environment having a relatively low pressure, to another environment having a somewhat higher pressure.

The device 10 includes a cylindrical rotor 14 rotatable about an axis A—A which is normally horizontal in use, and it includes at least one pocket 15 having a single access opening 16. Preferably the rotor 14 includes two pockets 15, 15', the pocket 15' having a single access opening 16'. However, other rotor and pocket configurations are possible, such as disclosed in said co-pending application Ser. No. 296,245 filed Aug. 24, 1981, the disclosure of which is hereby incorporated by reference herein.

The feeder 10 further comprises a housing 18 enclosing the rotor 14, the housing having an exterior periphery with an inlet port 19 and an outlet port 20. Particulate material entrained in gas, such as wood chips from a chips bin entrained in air, is introduced into a pocket 15, 15' of the rotor 14 through the low pressure inlet 19, and discharged into the higher pressure environment through the outlet port 20 (e.g. discharged into a steaming vessel).

The rotor 14 is mounted by suitable mounting means, such as the shaft 28 received by bushing 29 within end wall 30 (see FIG. 2), and a similar bushing and shaft portion at the opposite end of the rotor, for rotation about the axis A—A, and is powered in the direction of rotation α (see FIG. 1). A large clearance volume, indicated by reference numeral 31 in FIG. 1, is provided between housing 18 and the rotor 14, and sealing means are disposed in the large clearance volume 31 between the rotor 14 and housing 18. What has been described heretofore is shown in co-pending application Ser. No. 296,245.

According to the present invention, the sealing means disposed in the volume 31 consists essentially of a single shoe means, shown generally by reference numeral 33, disposed between the rotor 14 and housing 18 and having an opening 34 communicating with the inlet port 19; and means for biasing shoe means 33 into engagement with the rotor 14, the biasing means in the FIG. 1 embodiment taking the form of a plurality of pressure compensators 36 and the action of gravity. The opening 34 preferably is circular in cross-section and the shoe 33 comprises a metal body having an arcuate interior surface 35 of substantially the same curvature as the rotor 14 with which it is adapted to cooperate and comprising a cylindrical section having a maximum arcuate extent γ of about 150°.

In order to facilitate discharge of particulate material from within the pockets 15, 15' through the outlet 20 even though a relatively high pressure may exist at the outlet 20, the outlet 20 is constructed so that it is significantly larger than the inlet 19 so that an access opening 16, 16' of a pocket 15, 15' will be in operative communication with the outlet 20 during a great arcuate extent as the rotor 14 is rotating in direction α. Also gas blast means, which will hereinafter described, may be provided to facilitate discharge of the particulate material from the pockets 15, 15' into the outlet 20.

Each pressure compensator comprises a pressure responsive element 37 operatively disposed between housing 18 and the shoe 33. As illustrated in FIG. 1, the pressure response element 37 preferably comprises a piston reciprocal in a cylinder 38 extending from the housing 18. The fluid for applying a radially inwardly directed force with the piston 37 preferably is a clean oil supplied to cylinder 38 via a conduit 39 leading from a reservoir 40. Preferably the oil pressure acting on the piston 37 is proportional to process pressure, as illustrated in schematically in FIG. 1. That is, the pressure supplied by the oil to the piston 37 is proportional to the pressure in the environment existing at the high pressure outlet 20. The oil is fed from line 39 to cylinder 38 through a small orifice 41.

A small diameter conduit 42 extends from the cylinder 38 to the area of engagement between the shoe surface 35 and the exterior periphery of the rotor 14. This provides for a small bleeding of oil to lubricate the metal surfaces provided by the shoe surface 35 and the exterior of the rotor 14. The oil must be of a type which will not contaminate the particulate material since there will be some leakage into the particulate material. The open end termination 43 of the conduit 42 is provided in the uppermost corner of the cylinder 38. This positioning ensures that should any air exist in the cylinder 38—which very well might be the case at start-up—it will pass through the conduit 42 so as not to interfere with operation of the piston 37.

Means are also provided associated with the piston and shoe to take into account wear of the shoe 33 and allow an appropriate biasing force to be applied by the piston 37 even after wear of the shoe 33. Such wear compensating means take the form of a pair of freely rotatable balls 44, 45, the ball 44 operatively mounted within housing 46 attached to the shoe 33, and the ball 45 mounted within housing 47 attached to the piston 37. Seals, such as sealing rings 48, 49, are provided between the balls 44, 45 and the housings 46, 47. A tube 42 passes through the balls, and through an enlarged passageway 50 in cylinder 37, the passageway 50 providing sufficient clearance so that the conduit 42 can assume an angular position with respect to the piston 37 exterior face aside from perpendicular.

In order to provide for complete venting of gas from the pockets 15, 15' prior to (and during) filling of the pockets with particulate material from the inlet 19, according to the present invention an exhaust or vent 53 is provided adjacent the inlet 19, and the access openings 16, 16' are dimensioned so that they communicate with both vent 53 and inlet 19 at the same time during a fairly substantial arcuate extent as the rotor 14 rotates in direction α. The vent 53 is located immediately before the inlet 19 in the direction of rotation α.

For simplicity of construction and ease of replacement and repair, the particular vent and inlet structure illustrated in FIGS. 1 and 2 is preferably utilized. This structure comprises a single circular cross-section tubular member 55 which has an exterior diameter substantially identical to the interior diameter of the shoe opening 34 and is received thereby, with a divider 56 extending through the tube 55 and into contact (or just short of contact) with the exterior surface of the rotor 14. The divider 56 separates the tube 55 into a relatively large inlet port portion 19 and a relatively small vent portion 53. The housing 18 includes a tubular upper neck, or collar portion, 58 concentric with the member 55, and a replaceable cylinder wall 59 is disposed in contact with the interior surface of the neck 58 and the exterior surface of the portion of the shoe 33 defining the opening 34. Sealing means, such as O-rings 60 are provided between the shoe 33 and replaceable cylinder wall 59 to ensure sealing therebetween even when there is relatively movement between the shoe 33 and the replaceable cylinder wall 59 as the shoe wears.

As illustrated in FIG. 2, a plurality of pocket portions 15, 15' each having openings 16, 16' may be provided along the length of the rotor 14, with corresponding inlet ports and vents 19, 53 and outlet ports 20.

In the embodiment illustrated in FIG. 3, structures comparable to those in the FIGS. 1 and 2 embodiment are shown in the same reference numeral only preceded by a "1".

The major distinction between the FIG. 3 embodiment and the FIGS. 1 and 2 embodiment is the particular interconnections between the shoe 133 and housing 118, and the particular biasing means 136. In this embodiment, the inlet port 119 and vent 153 are distinct structures having a small arcuate spacing therebetween, and the shoe 133 has two openings formed therein, one opening 134 having the same cross-sectional configuration as the inlet port 119 and receiving it, and the other opening 65 communicating with the vent 153.

Further, in this embodiment only one pressure compensator 136 is provided, that pressure compensator comprising a piston 137 and cylinder 138, the cylinder 138 being supplied with oil from an oil system 140 essentially identical to that in the FIG. 1 embodiment (e.g. including a small orifice, reservoir, and responsive to process pressure). The piston 137 is annular, and engages an annular surface 66 on the top of the shoe 133 to provide the biasing action. In the structure illustrated in FIG. 3 no lubricating passageways are shown between the cylinder 138 and the interior surface 135 of the shoe 133 and the exterior of the rotor 114, however, if desired, such passageways could be provided.

Figure 5:
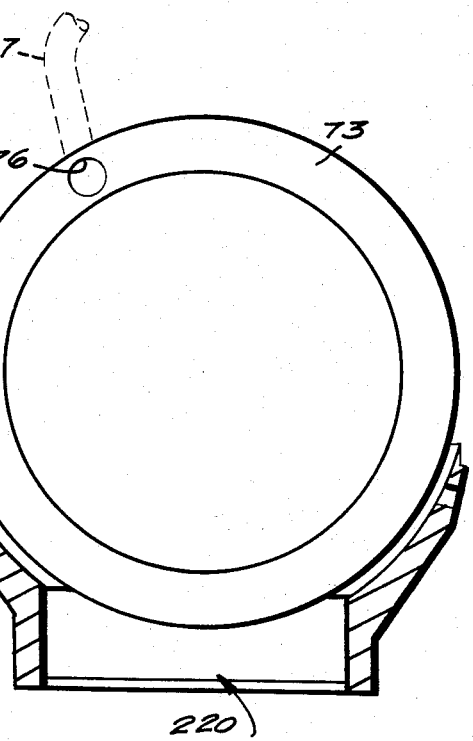
FIGS. 5 and 6 are end views looking at details of portions of the structure of FIG. 4.

As previously mentioned, it is desirable to also provide gas blast means for facilitating discharge of particulate material from a pocket to the outlet port 20 (i.e. from pocket 15' when the feeder 10 is in the position illustrated in FIG. 1). Such gas blast means will be described with reference to FIGS. 4–6, the structure illustrated in FIGS. 4–6 differing only slightly from that illustrated in FIGS. 1 and 2, and structures in the FIGS. 4–6 embodiment comparable to those in the FIGS. 1 and 2 embodiment being illustrated by the same reference numeral only preceded by a "2".

Figure 6:
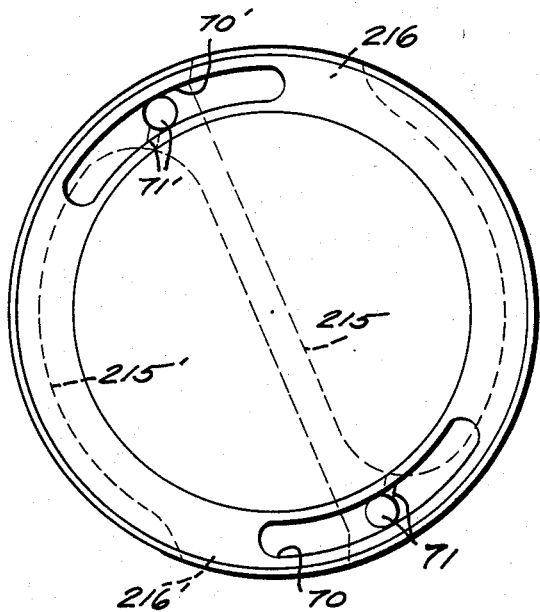

The rotor 214, as seen most clearly in FIGS. 4 and 6, has means defining an arcuate opening 70 at one portion thereof, and an arcuate opening 70' at an opposite end portion thereof. The arcuate opening 70' communicates through passageway 71' with the pocket 215', at the opposite end thereof as the access opening 216'. Similarly, the arcuate opening 70 communicates through passageway 71 with the interior of pocket 215 at the opposite end thereof as access opening 216. The arcuate extents of the openings 70, 70' are dimensioned so that gases are supplied therethrough to pockets 215, 215' a few degrees before the openings 216, 216' face precisely downwardly, and a few degrees afterwards. In FIG. 6, the arcuate extent of the openings 70, 70' are shown to be about 60° each.

The housing 218 includes a stationary ring 73 spring biased (by springs disposed in spacer assembly 74) into contact with the end surface of rotor 214 containing arcuate openings 70, 70'. A stationary opening 76 is formed in the ring 73 near the top thereof and spaced the same radial distance from the axis A—A as the openings 70, 70' for communication with the openings 70, 70'. A conduit, shown schematically by reference numeral 77 in FIGS. 4 and 5, extends from opening 76 through housing end wall 230 to a pressurized source of gas 78. The gas source is preferably a source of air, steam, carbon dioxide, or nitrogen, and is at a pressure of about 15–30 psi greater than the process pressure (e.g. the pressure at outlet 220).

OPERATION

Exemplary apparatus according to the invention having been described, a typical sequence of operation thereof will now be set forth:

A power source rotates shaft 28 to effect rotation of rotor 14 in direction a, and any air in cylinders 38 bleeds through conduits 42, and cylinders 38 fill with oil, applying pressure to the cylinders 37 proportional to the pressure at outlet 20 to effect a good seal between 33 and 14. Wood chips are fed through inlet port 19 through access opening 16 into pocket 15, any gas in the pocket 15 venting through opening 34 and vent 53. When the pocket 15 has rotated so that the opening 16 starts to face downwardly, the chips will fall out of it into clearance volume 31 and outlet port 20. When the gas blast means 70, 76, 78, etc. are utilized, gas at a higher pressure than exists at outlet 20 forces the wood chips out of the pocket.

During rotation of the rotor 14, the interior surface 53 of sealing shoe 33 is held in contact with the exterior surface of the rotor 14, and a small amount of lubricating oil is provided through conduits 42 from cylinders 38. As the pockets 15, 15' rotate so that the openings 16 approach a vertically upward position, the pockets come in contact with the vent 53 and the gas is vented therefrom, and at a point during the rotation of the rotor 14, gas is vented from a pocket 15, 15' while it is simultaneously filled with wood chips or the like through inlet 19.

It will thus be seen that according to the present invention, an effective low pressure feeder has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A low pressure feeder comprising: a rotor containing at least one pocket having a single access opening thereto, said rotor rotatable about an axis; a housing enclosing said rotor, said housing having an exterior periphery with an inlet port and an outlet port, each of said ports for registry with said access opening to said at least one pocket; means for mounting said rotor in said housing for rotation with respect to said ports about said given axis of rotation, and in a given direction; a large clearance volume being provided between said rotor and said housing; and sealing means disposed in said large clearance volume between said rotor and said housing; said sealing means consisting essentially of a single shoe means disposed between said rotor and said housing and having an opening communicating with said inlet port and in sealed engagement therewith; means for biasing said shoe means into engagement with said rotor, comprising means for applying a force to said shoe means proportional to the fluid pressure adjacent the outlet port, which comprise at least one pressure compensator including a fluid pressure-responsive element operatively disposed between said housing and said shoe means, and operatively connected to a source of oil under pressure; means for bleeding oil from said pressure compensator to the interface between said rotor and shoe means to provide lubrication of the contact area between said rotor and said shoe means; said pressure-responsive element comprising a piston movable in a cylinder operatively attached to said housing; connection means between said piston and said shoe means for providing continued operation of said pressure compensator as said shoe means wears; and said connection between said piston and said shoe means comprising a pair of balls, one sealingly rotatable with respect to each of said shoe means and said piston, and a tube interconnecting said balls.

2. A device as recited in claim 1 wherein said rotor is rotatable about a horizontal axis and wherein said inlet port and outlet port are vertically aligned, said inlet port being disposed vertically about said outlet port.

3. A low pressure feeder comprising: a rotor containing at least one pocket having a single access opening thereto, said rotor rotatable about an axis; a housing enclosing said rotor, said housing having an exterior periphery with an inlet port and an outlet port, each of said ports for registry with said access opening to said at least one pocket; means for mounting said rotor in said housing for rotation with respect to said ports about said given axis of rotation, and in a given direction; a large clearance volume being provided between said rotor and said housing; and sealing means disposed in said large clearance volume between said rotor and said housing; said sealing means consisting essentially of a single shoe means disposed between said rotor and said housing and having an opening communicating with said inlet port and in sealed engagement therewith; means for biasing said shoe means into engagement with said rotor, comprising means for applying a force to said shoe means proportional to the fluid pressure adjacent the outlet port, which comprise at least one pressure compensator including a fluid pressure-responsive element operatively disposed between said housing and said shoe means, and operatively connected to a source of oil under pressure; means for bleeding oil from said pressure compensator to the interface between said rotor and shoe means to provide lubrication of the contact area between said rotor and said shoe means; said means for providing bleeding of oil comprises a small diameter conduit extending from the area of interface between said shoe means and said rotor to a volume on the opposite side of said compensator pressure-responsive element as said shoe means, said conduit including an end termination opening to said volume to vent any gas collecting in said volume so that it does not interfere with operation of said pressure compensator.

4. A device as recited in claim 3 wherein said shoe means comprises an annular portion surrounding the inlet port and in sliding contact therewith; and wherein said housing comprises a neck surrounding said inlet port; and further comprising a replaceable cylinder wall disposed in said neck between said shoe means annular portion and said neck; and seal means provided between said shoe means annular portion and said replaceable cylinder wall.

5. A device as recited in claim 4 further comprising vent means for communicating with said at least one pocket access opening to effect venting of gas therefrom; and wherein said inlet port and said vent means are immediately adjacent each other separated by a dividing wall and contained within the same tubular member; and wherein said shoe means annular portion surrounds said tubular member.

6. A device as recited in claim 3 further comprising gas blast means for providing a blast of gas to said at least one pocket to effect discharge of material from within said pocket when said pocket is in communication with said outlet port.

7. A device as recited in claim 6 wherein said outlet port has significantly larger cross-sectional dimensions than said inlet port, said dimensions also being significantly greater than the cross-sectional dimensions of said access opening.

8. A device as recited in claim 3 wherein said outlet port has significantly larger cross-sectional dimensions than said inlet port, said dimensions also being significantly greater than the cross-sectional dimensions of said access opening.

9. A device as recited in claim 3 wherein said pressure-responsive element comprises a piston movable in a cylinder operatively attached to said housing; and further comprising connection means between said piston and said shoe means for providing continued operation of said pressure compensator as said shoe means wears.

10. A device as recited in claim 9 wherein said connection between said piston and said shoe means comprises a pair of balls, one sealingly rotatable with respect to each of said shoe means and said piston, and a tube interconnecting said balls.

11. A low pressure feeder comprising: a rotor containing at least one pocket having a single access opening thereto, said rotor rotatable about an axis; a housing enclosing said rotor, said housing having an exterior periphery with an inlet port and an outlet port, each of said ports for registry with said access opening to said at least one pocket; means for mounting said rotor in said housing for rotation with respect to said ports about said given axis of rotation, and in a given direction; a large clearance volume being provided between said rotor and said housing; and sealing means disposed in said large clearance volume between said rotor and said housing; said sealing means consisting essentially of a single shoe means disposed between said rotor and said housing and having an opening communicating with said inlet port and in sealed engagement therewith; and means for biasing said shoe means into engagement with said rotor, comprising means for applying a force to said shoe means proportional to the fluid pressure adjacent the outlet port, which comprise at least one pressure compensator including a piston movable in a cylinder operatively attached to said housing, and operatively disposed between said housing and said shoe means, and operatively connected to a source of fluid under pressure; and connection means between said piston and said shoe means for providing continued operation of said pressure compensator as said shoe means wears, comprising a pair of balls, one sealingly rotatable with respect to each of said shoe means and said piston, and a tube interconnecting said balls.

* * * * *